INVENTORS
MERLE E. NICHOLAS
BY JAMES J. RENIER

ATTORNEY

United States Patent Office 3,336,212
Patented Aug. 15, 1967

3,336,212
CONDITION RESPONSIVE DEVICE
Merle E. Nicholas, Coon Rapids, and James J. Renier, Hopkins, Minn., assignors to Honeywell Inc., Minneapolis, Minn., a corporation of Delaware
Filed Sept. 1, 1964, Ser. No. 393,603
9 Claims. (Cl. 204—195)

This is a continuation-in-part of pending application Ser. No. 91,999, filed Feb. 27, 1961, and entitled, Condition Responsive Apparatus, now abandoned.

The invention relates to a condition responsive device which is arranged to indicate the extent of exposure to certain temperatures. More particularly, this invention is concerned with the improvement of the temperature indicator disclosed in U.S. Patent 3,046,786, by Bernt M. Tessem.

Briefly, the device disclosed in the Tessem patent operates on the principle of a galvanic cell employing a pair of spaced dissimilar electrodes contacting a porous medium. The porous medium is impregnated with an electrolyte and an indicator which has one color in the presence of the electrolyte but which is sensitive to pH or the like. Subsequent to impregnation of the porous medium with the electrolyte, electrolytic action occurs at the electrodes, there being an external electric connection therebetween. The electrolytic action causes an oxidation-reduction reaction to occur at the electrodes and accordingly a reaction product such as hydroxyl, hydrogen (or hydronium), metal ions or the like is formed. These reaction products formed at the electrodes migrate along the porous medium at a rate determined by the time-temperature relationship of the environment. This rate is a function of several temperature dependent variables including viscosity, the potential difference existing between the electrodes and the rate of generation of the reaction product which is a temperature dependent function of the kinetics of electrode reaction. In addition, the rate of migration is also dependent upon non-temperature sensitive variables such as electrode geometry and device configuration. Inasmuch as the presence or absence of the reaction product may be readily ascertained either by its own inherent color or by reaction with the indicator, a colored area along the extent of the porous medium will be present. The relative length of the color converted area is therefore an indication of the integrated extent of exposure of the device to certain temperatures.

The device of the Tessem patent has proved satisfactory to a degree. However, as disclosed in that patent, the device has certain shortcomings. Particularly, once the ions have migrated a certain distance across the porous medium, the colored boundary becomes somewhat indistinct due to the interference of other ions contained in the porous medium. Furthermore, this interference has been found to interrupt the movement of the colored boundary thus prematurely ending the useful life of the device as far as continued operation and indication is concerned.

It is an object of this invention to overcome the shortcomings noted above by the addition of a complexing agent to the Tessem device.

It is another object to extend the useful life of the device by extending the movement of the colored area over an increased length of the porous medium through the use of a complexing agent.

It is still another object of this invention to improve the delineation of the leading edge of the migrating boundary by the addition of a complexing agent thus making the device more accurate and easier to read and use.

These and other objects of this invention will become apparent upon a study of the following specification, appended claims and the accompanying drawings, wherein:

Figure 1:
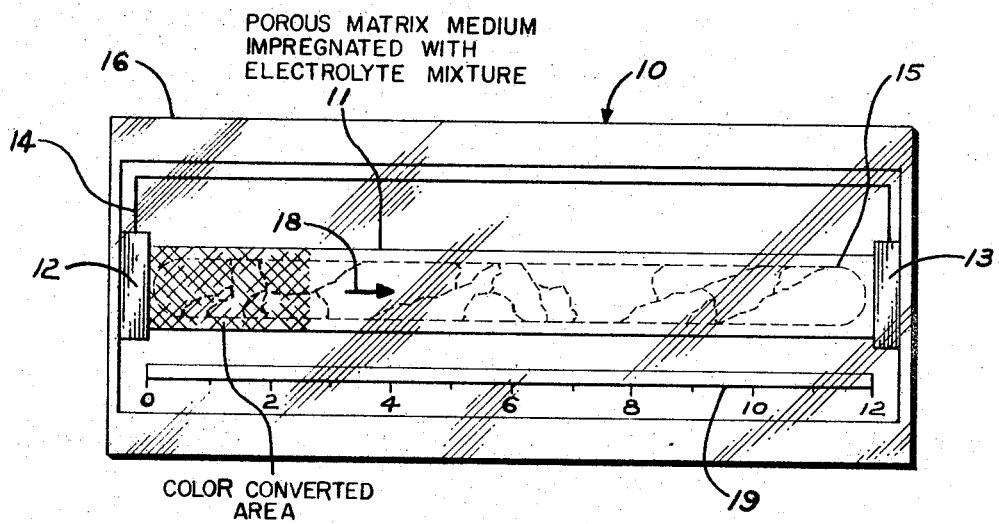
FIGURE 1 is a plan view of a preferred modification of the Tessem device as it appears subsequent to exposure to a predetermined temperature for a certain period of time.
Figure 2:
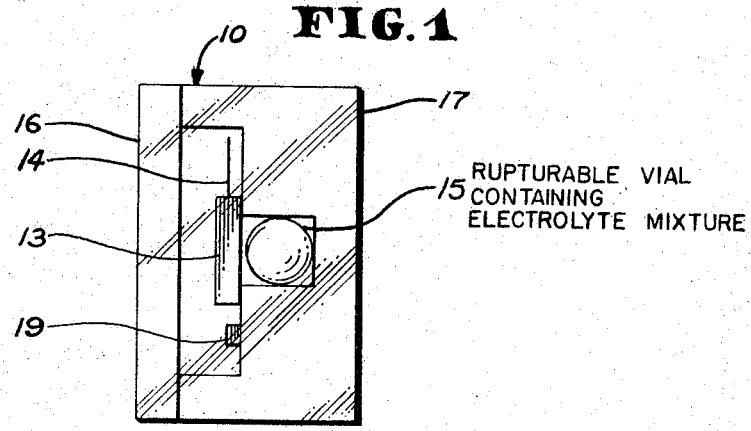
FIGURE 2 is an end view of the device of FIGURE 1 showing one modification for positioning the various elements in the device.

Referring now to FIGURES 1 and 2, the indicating device, generally designated as 10, includes a porous member designated as 11, such as filter paper or the like, having a pair of dissimilar metallic electrodes 12 and 13 such as copper and tin respectively attached at spaced intervals along the paper 11. An external conductor such as the wire 14 is arranged to complete a galvanic circuit which passes through the porous medium 11. The device may further be provided with a rupturable vial 15 containing the electrolyte, which is arranged to be positioned adjacent to the porous medium 11 and which upon rupture thereof allows the electrolyte to impregnate the porous medium with a solution of an electrolyte such as an aqueous eutectic solution of potassium chloride. The vial 15 is preferably prepared from a non-elastic frangible material such as glass or the like which will burst when the contents expand upon freezing or which may be broken as desired to activate the device. The charge within vial 15 may include an indicator such as phenolphthalein and, in accordance with the present invention, a quantity of a complexing agent such as a citrate, a tartrate or ethylenediaminetetraacetic acid. Alternately, the paper of course, may be impregnated with the indicator or complexing agent or both prior to the assembly of the device. The electrodes 12 and 13 are selected from dissimilar metallic substances according to the considerations disclosed in the Tessem patent.

The entire device may be enclosed in a plastic case, the cover of which 16 is a clear plastic, such as polystyrene, with the container portion 17 being of an opaque plastic, such as a modified polystyrene. Both types of plastic are available commercially.

Figure 3:
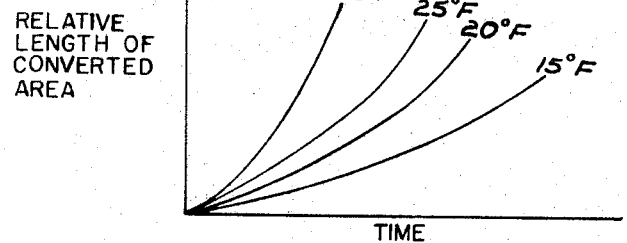
FIGURE 3 shows a family of curves illustrating the operation of the device.

In operation, the Tessem apparatus functions as follows: The rupturable vial is filled with an electrolyte-indicator solution and arranged in physical contact with the porous filter paper medium 11. The vial is ruptured to activate the device and the filter paper is impregnated with the electrolyte solution. Contact between the electrolyte and electrodes 12 and 13 causes an electrolytic action. Accordingly, in one embodiment of the device when aqueous KCl is used as the electrolyte, hydroxyl ions are created at the more noble electrode and, inasmuch as the hydroxyl ion is a highly mobile ion and capable of carrying charges at a rate which exceeds that of other anions, most of the current is carried by this ion. Accordingly, the presence of the hydroxyl ion is indicated by a color change in the phenolphthalein indicator and the degree of travel of the hydroxyl ion across the porous medium (indicated by arrow 18) provides an indication of the integrated time-temperature history of the environment to which the apparatus has been exposed. The distance the ions have migrated along the length of the color converted area may be measured with reference to scale 19. Reference is made to FIGURE 3 wherein the relative length of the color converted area is plotted against time at constant temperatures. It is seen, therefore, that at lower temperatures such as 15° F. a longer time is required for the colored boundary to move any given distance than at higher temperatures such as 30° F.

As noted above, during operation of the Tessem device, hydroxyl ions are formed at copper electrode 12 which migrate along porous medium 11 in the direction indicated by arrow 18. Concurrently, tin ions are formed at electrode 13 which migrate along the porous medium 11 in the opposite direction. As also previously noted, when the two types of ions meet, an undesirable interference is caused by the tin ions. That is, they interfere with the migration of the hydroxyl ions by causing undesirable precipitation and hence interfere with the movement of the colored boundary. Furthermore, such interfering ions also cause the leading edge of the boundary to assume an indistinct appearance which makes the visual measurement of its length difficult and susceptible to inaccuracies.

As a means of prohibiting this undesirable interference, the present invention includes within the electrolyte solution a quantity of complexing agent. By use of a complexing agent, the interfering ions are bound into a stable complex so that they are unable to precipitate the hydroxyl ion or to interfere otherwise in the indicator reaction.

As an example of the improvement offered by the present invention, the typical length of the color converted area, in a device having copper and tin electrodes spaced 24 mm. apart and utilizing KCl electrolyte, is less than 16 mm. Whereas, if sodium tartrate, a citrate or ethylenediaminetetraacetic acid is added to the electrolyte, the length of the color converted area has been found to increase to from 18 to 20 mm. An increase of 2 to 4 mm. in length is considerable in view of the fact that the total distance available is only 24 mm. It is to be understood that the amount of complexing agent required for any particular device will be dependent on the particular size, configuration and materials used for the electrodes, porous medium and electrolyte.

There are several methods of introducing the complexing agent into the device. It may be included in vial 15 with the electrolyte. On the other hand, it may be placed on porous medium 11 to be dissolved into the electrolyte when the device is activated. Porous medium 11 may be impregnated with the complexing agent in a powder or crystalline form. Alternatively, porous medium 11 may be dipped into a solution of complexing agent during the assembly of the device. A 2% solution of complexing agent has been found satisfactory for the latter use in devices having a 24 mm. spacing between the electrodes.

It will be obvious to those skilled in the art that other materials may be used for the electrodes than tin and copper. Virtually any metals may be used as long as they are far enough apart on the electromotive scale. Furthermore, many electrolytes and indicators are available which will function satisfactorily. Likewise, it will be apparent that the complexing agent used and the amounts thereof will be dependent upon the metals involved and size and shape of the device.

What is claimed is:

1. A device for visually indicating the extent to which substances have been exposed to a temperature exceeding a safe predetermined minimum comprising a porous medium containing an electrolyte composition which changes color upon contact with ions migrating across said medium to produce a color converted area thereupon, a first metal body in contact with said medium near one end thereof, a second dissimilar metal body in contact with said medium near the other end thereof, and a metallic conductor connecting said metal bodies, said electrolyte composition being capable of electrolytically reacting with said first metal body to form ions which migrate through said medium at a rate proportional to time and to the increase in temperature above said predetermined minimum and which ions produce a color change in said electrolyte composition during migration, said electrolyte composition being particularly characterized in that it includes a quantity of a complexing agent to prevent the interaction of said migrating ions with other reaction products produced by the electrolytic action in said device at said metal bodies thus increasing the delineation of the leading edge of said color converted area in said electrolyte on said medium and increasing the migration distance of said migrating ions.

2. The device of claim 1 wherein the complexing agent is one selected from the group consisting of a tartrate, a citrate, and ethylenediaminetetraacetic acid.

3. The device of claim 1 wherein the complexing agent is ethylenediaminetetraacetic acid.

4. A device for visually indicating the extent to which substances have been exposed to a temperature exceeding a safe predetermined minimum comprising a porous medium, a first metal body in contact with said medium near one end thereof, a second dissimilar metal body in contact with said medium near the other end thereof, a metallic conductor connecting said metal bodies, a rupturable vial disposed adjacent said medium and containing an electrolyte composition which upon rupture of said vial is capable of impregnating said medium and initiating an electrolytic reaction with said metal bodies, said reaction forming ions at said first metal body which migrate along said medium at a rate proportional both to time and to the increase in temperature above said predetermined minimum and which ions produce during migration a color converted area in said electrolyte on said medium, said electrolyte composition being particularly characterized in that it includes a quantity of a complexing agent to prevent the interaction of said migrating ions with other reaction products produced by said electrolytic action thus increasing the delineation of the leading edge of said color converted area in said electrolyte on said medium and increasing the migration distance of said migrating ions.

5. The device of claim 4 wherein the complexing agent is one selected from the group consisting of a tartrate, a citrate, and ethylenediaminetetraacetic acid.

6. The device of claim 4 wherein the complexing agent is ethylenediaminetetraacetic acid.

7. A device for visually indicating the extent to which substances have been exposed to a temperature exceeding a safe predetermined minimum comprising a porous medium, a pair of dissimilar metal bodies contacting said medium in a spaced relationship, a metallic conductor connecting said metal bodies, an electrolyte disposed near said medium which electrolyte upon contacting said medium and said metal bodies initiates an electrolytic action therewith to produce ions at one of said metal bodies which migrate along said medium at a rate proportional both to time and to the increase in temperature above said predetermined minimum and which ions produce during migration a color converted area in said electrolyte on said medium, said porous medium being particularly characterized in that it contains a quantity of a complexing agent to prevent the interaction of said migrating ions with other reaction products produced by said electrolytic action thus increasing the delineation of the leading edge of said color converted area in said electrolyte on said medium and increasing the migration distance of said migrating ions.

8. The device of claim 7 wherein the complexing agent is one selected from the group consisting of a tartrate, a citrate, and ethylenediaminetetraacetic acid.

9. The device of claim 7 wherein the complexing agent is ethylenediaminetetraacetic acid.

(References on following page)

References Cited

UNITED STATES PATENTS

| | | | |
|---|---|---|---|
| 3,046,786 | 7/1962 | Tessem | 204—195 |
| 3,055,759 | 9/1962 | Busby et al. | 73—256 |
| 3,079,343 | 2/1963 | Bernard | 252—408 |

OTHER REFERENCES

Strain et al., "Analytical Chemistry," vol. 23, No. 6, June 1951, pp. 816–823.

JOHN H. MACK, *Primary Examiner.*

T. TUNG, *Assistant Examiner.*